United States Patent
Borean (10) Patent No.: US 8,910,599 B2
(45) Date of Patent: Dec. 16, 2014

(54) MULTI-CYLINDER INTERNAL COMBUSTION ENGINE, WITH A SYSTEM FOR VARIABLE ACTUATION OF THE INTAKE VALVES AND WITH COMPENSATION OF THE DIFFERENCES IN THE TORQUE PRODUCED BY THE CYLINDERS, AND CONTROL METHOD IMPLEMENTED IN THIS ENGINE

(75) Inventor: Fabio Borean, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 522 days.

(21) Appl. No.: 13/305,433

(22) Filed: Nov. 28, 2011

(65) Prior Publication Data

US 2012/0260872 A1 Oct. 18, 2012

(30) Foreign Application Priority Data

Apr. 15, 2011 (EP) .................................. 11162708

(51) Int. Cl.
| | | |
|---|---|---|
| F01L 1/00 | (2006.01) | |
| F01L 9/02 | (2006.01) | |
| F02D 13/02 | (2006.01) | |
| F02D 41/00 | (2006.01) | |
| F02D 41/14 | (2006.01) | |

(52) U.S. Cl.
CPC ............. F01L 9/025 (2013.01); F02D 13/0203 (2013.01); F02D 13/0223 (2013.01); F02D 13/0253 (2013.01); F02D 41/0002 (2013.01); F02D 41/0085 (2013.01); F02D 41/1497 (2013.01); F02D 2041/001 (2013.01); Y02T 10/42 (2013.01); Y02T 10/18 (2013.01)
USPC ....................................... 123/90.1; 123/90.14

(58) Field of Classification Search
CPC .................................... F01L 1/12; F01L 1/465
USPC .................. 123/90.1, 90.14, 90.15, 321, 322, 123/345–348
See application file for complete search history.

(56) References Cited

U.S. PATENT DOCUMENTS

| | | | |
|---|---|---|---|
| 6,691,669 B2 * | 2/2004 | Surnilla et al. ................ | 123/295 |
| 7,246,595 B1 * | 7/2007 | Hoare et al. ................... | 123/294 |
| 7,440,836 B2 * | 10/2008 | Yasui et al. .................... | 701/101 |
| 2007/0074705 A1 | 4/2007 | Nakasaka et al. | |

FOREIGN PATENT DOCUMENTS

| | | |
|---|---|---|
| DE | 102006030192 A1 | 1/2008 |
| EP | 0803642 A1 | 10/1997 |
| EP | 1378638 A1 | 7/2004 |
| EP | 1726790 A1 | 11/2006 |
| FR | 2796417 A1 | 1/2011 |
| WO | 2006050383 A2 | 5/2006 |

OTHER PUBLICATIONS

Sep. 7, 2011 European Search Report in related Application No. 11162708.9.

* cited by examiner

*Primary Examiner* — John Kwon
(74) *Attorney, Agent, or Firm* — Heslin Rothenberg Farley & Mesiti PC; Victor A. Cardona, Esq.

(57) ABSTRACT

A multi-cylinder internal combustion engine is provided with a system for the variable actuation of the intake valves, and such system is used to vary the amount of air taken in by each cylinder so as to reduce to the minimum or entirely eliminate the differences in the torque produced by the various cylinders and hence limit the irregularities in the rotation speed of the engine shaft.

2 Claims, 5 Drawing Sheets

FIG.1

PRIOR ART

|  | Cyl1 | Cyl2 | Cyl3 | Cyl4 |
|---|---|---|---|---|
| ALZATA PIENA / FULL LIFT | -1,2% | 2,5% | 1,5% | -2,7% |
| CON COMPENSAZIONE / WITH COMPENSATION | 0,1% | -0,5% | 0,0% | 0,4% |
| NO COMPENSAZIONE / NO COMPENSATION | -3,8% | 2,9% | 4,2% | -3,3% |

MULTI-CYLINDER INTERNAL COMBUSTION ENGINE, WITH A SYSTEM FOR VARIABLE ACTUATION OF THE INTAKE VALVES AND WITH COMPENSATION OF THE DIFFERENCES IN THE TORQUE PRODUCED BY THE CYLINDERS, AND CONTROL METHOD IMPLEMENTED IN THIS ENGINE

CROSS REFERENCE TO RELATED APPLICATIONS

This application claims priority to European Patent Application No. 11162708.9, filed Apr. 15, 2011, the entire disclosure of which is incorporated herein by reference.

FIELD OF THE INVENTION

The present invention refers to multicylinder internal combustion engines, of the type comprising, for each cylinder:
- a combustion chamber,
- at least one intake conduit and at least one exhaust conduit ending up in said combustion chamber,
- an intake valve and an exhaust valve associated to said intake and exhaust conduits and each provided with respective return springs which push the valve towards a closed position,
- a camshaft for actuating the intake valves by means of respective tappets,
- wherein each intake valve is controlled by the respective tappet against the action of the abovementioned return spring by interposing hydraulic means including a pressurised fluid chamber which is faced by a pumping spring connected to the tappet of the valve,
- a solenoid valve which can be controlled between a closed condition and an open condition in which said solenoid valve places said pressurised fluid chamber in communication with an exhaust channel, with the aim of decoupling the intake valve from the respective tappet and cause the quick closure of the intake valve due to the respective return spring,
- electronic control means, for controlling said solenoid valve to vary the opening instant and/or the closing instant and/or the lift of the intake valve as a function of one or more engine operative parameters,
- wherein said electronic control means are programmed for the differentiated control of the solenoid valve associated to each cylinder.

An engine of the type specified above is described in EP-A-1 378 638 of the Applicant. Over the years, the Applicant has developed internal combustion engines comprising a system for the variable actuation of the intake valves of the previously indicated type, sold under the trademark "MULTIAIR". The Applicant owns various patents and patent applications regarding engines provided with a system of the type described above. Such system, which will be described in detail hereinafter with reference to FIG. 1 of the attached drawings, allows varying the opening instant and/or the closing instant and/or the lift of the intake valves as a function of one or more engine operative parameters.

In document EP-A-1 378 638, the Applicant proposed a method for controlling the engine in which, using the aforementioned "MULTIAIR" system, the abovementioned solenoid valves associated to the various engine cylinders are controlled in a differentiated manner, so as to substantially reduce the differences of the amount of air taken in by the various engine cylinders to zero.

Further experiments and studies conducted by the Applicant however revealed that such method for controlling the engine is not entirely satisfactory, given that it does not guarantee uniformity in the operative performance of the various engine cylinders and therefore does not eliminate the irregularities in the rotation speed of the engine shaft.

OBJECT OF THE INVENTION

The object of the present invention is to provide an engine of the type described above, capable of allowing to obtain a compensation of the differences in the torque produced by the various engine cylinders, so as to reduce the irregularities in the rotation speed of the engine shaft to the minimum.

A further object lies in the fact of allowing attaining such object through relatively simple and reliable means.

SUMMARY OF THE INVENTION

In order to attain such object, the invention aims at providing an engine of the type indicated at the beginning of the present description and further characterized in that the abovementioned electronic control means receive signals indicating the operative performance of each cylinder during the operation of the engine and are programmed to dynamically vary the amount of air taken in by each cylinder during the operation of the engine, through the differentiated control of said solenoid valves, so as to maintain the torques produced by the engine cylinders substantially identical to each other.

According to a further characteristic, the engine according to the invention further comprises:
- means for sensing the rotation speed of the engine, and
- a first electronic module for analysing the signal emitted by said sensor means, adapted to dynamically obtain, during the operation of the engine, signals indicating the differences of the torque produced by the various cylinders, and
- a second electronic module adapted to dynamically calculate, during the operation of the engine, with a closed loop procedure, as a function of the abovementioned signals indicating the differences of the torque produced by the various cylinders, a first correction regarding the amount of air taken in by one cylinder with respect to the other which should be implemented so as to obtain torques produced by the various cylinders substantially identical to each other.

Still according to a further characteristic of the invention, the engine further comprises:
- means for sensing the engine load, and
- a third electronic module adapted to statically calculate, with an open loop procedure, by means of previously memorised experimental maps, as a function of the signals indicating the rotation speed of the engine and the engine load, a second correction regarding the amount of air taken in by one cylinder with respect to the other which should be implemented so as to obtain torques produced by the various cylinders substantially identical to each other, and
- a fourth electronic module which receives the correction signals from said second module and from said third module and processes them to emit a signal indicating a variation of the crank angle value corresponding to the opening of the intake valve for each cylinder of the engine.

The invention also aims at providing the control method implemented in the engine described above.

Due to the characteristics indicated above, the engine according to the invention allows easily obtaining, exploiting the operative flexibility of the "MULTIAIR" system, a substantially constant operative performance of the various engine cylinders, regardless of the difference of the fluid dynamic conditions in which the cylinders operate, hence substantially eliminating the irregularities in the rotation speed of the engine shaft.

BRIEF DESCRIPTION OF THE DRAWINGS

Further characteristics and advantages of the invention will be apparent from the description that follows with reference to the attached drawings, provided purely by way of non-limiting example, wherein.

DETAILED DESCRIPTION OF THE INVENTION

Over the years, the Applicant has developed internal combustion engines comprising a system for the variable actuation of the intake valves of the previously indicated type, sold under the trademark "MULTIAIR". The Applicant owns various patents and patent applications regarding engines provided with a system of the type indicated above.

Figure 1:
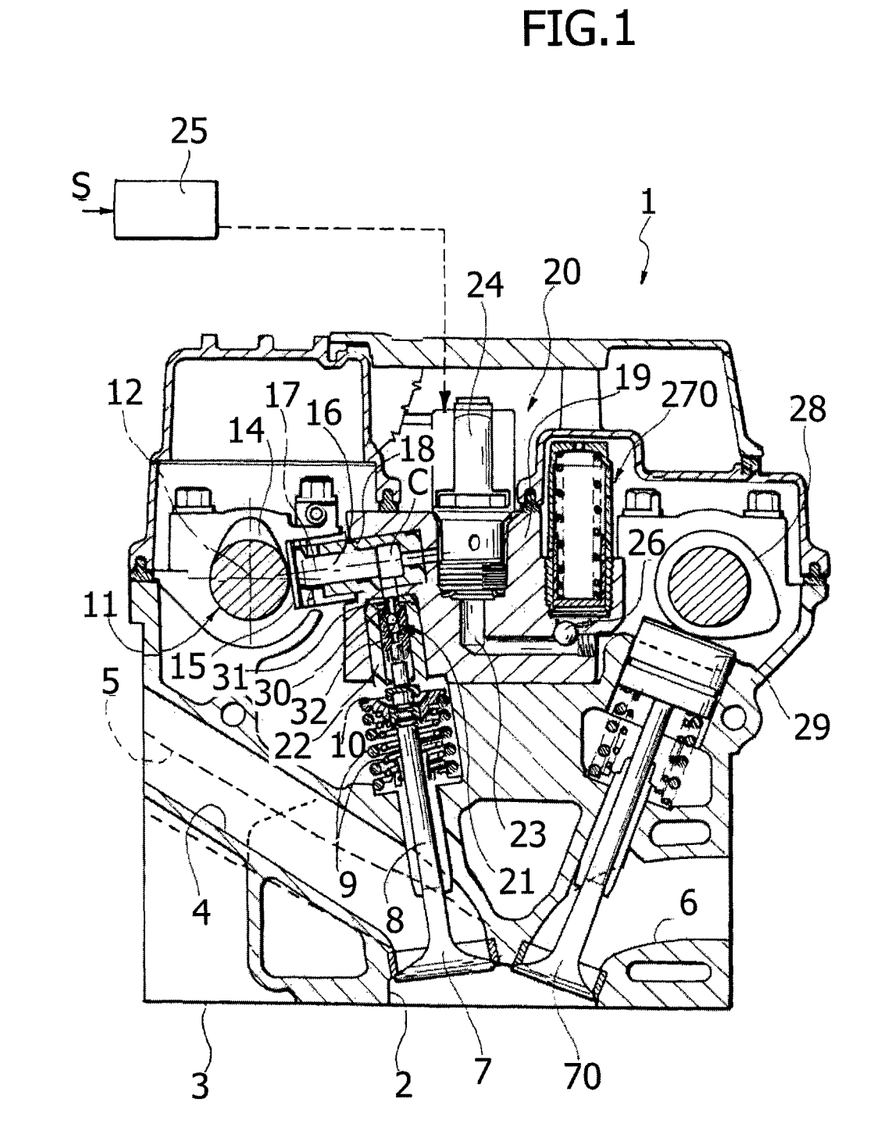
FIG. 1 is a cross-sectional view of an engine provided with the "MULTIAIR" system, as described in the European patent EP 0 803 642 B1 of the Applicant.

FIG. 1 of the attached drawings shows a cross-sectional view of an engine provided with "MULTIAIR" system, as described in the European patent EP 0 803 642 B1 of the Applicant.

With reference to such FIG. 1, the engine illustrated therein is a multicylinder engine, for example four-cylinder inline engine, comprising a cylinder head 1. The head 1 comprises, for each cylinder, a cavity 2 formed by the base surface 3 of the head 1, defining the combustion chamber, in which the two intake conduits 4, 5 and two exhaust conduits 6 end up. The communication of the two intake conduits 4, 5 with the combustion chamber 2 is controlled by two intake valves 7, of the conventional mushroom type, each comprising a stem 8 slidably mounted in the body of the head 1.

Each valve 7 is returned towards the closed position by springs 9 interposed between an inner surface of the head 1 and an end retaining cap 10 of the valve. The communication of the two exhaust conduits 6 with the combustion chamber is controlled by two valves 70, also of the conventional type, to which springs 9 for return towards the closed position are associated.

The opening of each intake valve 7 is controlled, as described hereinafter, by a camshaft 11 rotatably mounted around an axis 12 within supports for the head 1, and comprising a plurality of cams 14 for the actuation of the intake valves 7.

Each cam 14 controlling an intake valve 7 cooperates with the plate 15 of a tappet 16 slidably mounted along an axis 17 which, in the case of the example illustrated in the mentioned prior art document, is substantially directed at 90° with respect to the axis of the valve 7. The plate 15 is returned against the cam 14 by a spring associated thereto. The tappet 16 constitutes a pumping piston slidably mounted within a bushing 18 carried by a body 19 of a preassembled assembly 20, incorporating all electrical and hydraulic devices associated to the actuation of the intake valves, according to the description outlined hereinafter.

The pumping piston 16 is capable of transmitting a thrust to the stem 8 of the valve 7, so as to cause the opening of the latter against the action of the elastic means 9, by means of pressurized fluid (preferably oil coming from the engine lubrication circuit) present in a pressure chamber C to which the pumping piston 16 is faced, and by means of a piston 21 slidably mounted in a cylindrical body constituted by a bushing 22 also carried by the body 19 of the sub-assembly 20.

Still in the solution described in FIG. 1, the pressurised fluid chamber C associated to each intake valve 7 can be placed in communication with an exhaust channel 23 through a solenoid valve 24. The solenoid valve 24, which can be of any known type adapted to the function illustrated herein, is controlled by electronic control means, indicated schematically with 25, as a function of signal S indicating the operating parameters of the engine, such as the position of the accelerator and the number of engine revolutions.

When the solenoid valve 24 is open, the chamber C enters in communication with the channel 23, hence the pressurised fluid present in the chamber C flows into such channel and thus obtaining the decoupling of the cam 14 and the decoupling of the respective tappet 16 from intake valve 7, which thus quickly returns to the closure position thereof under the action of the return springs 9. Thus, controlling the communication between the chamber C and the exhaust channel 23, allows varying the opening time and the travel of each intake valve 7 at will.

The exhaust channels 23 of the various solenoid valves 24 end up in the same longitudinal channel 26 communicating with pressure accumulators 27, only one of which can be observed in FIG. 1.

All tappets 16 with the associated bushings 18, the pistons 21 with the associated bushings 22, the solenoid valves 24 and the respective channels 23, 26 are carried by and obtained from the abovementioned body 19 of the preassembled assembly 20, to the advantage of an engine that is quick and easy to assemble.

The exhaust valves 70 associated to each cylinder are controlled, in the embodiment illustrated in FIG. 1, conventionally, by a respective camshaft 28, through respective tappets 29, even though, in the case of the mentioned prior art document, an application of the hydraulic actuation system also controlling exhaust valves cannot be excluded generally.

Still with reference to FIG. 1, the variable volume chamber defined within the bushing 22 and facing the piston 21 (which is illustrated in the minimum volume condition thereof in FIG. 1, piston 21 being in the upper end stop position thereof) communicates with the pressurised fluid chamber C through an opening 30 obtained in an end wall of the bushing 22. Such opening 30 is engaged by an end nose 31 of the piston 21 so as to provide a hydraulic braking of the movement of the valve 7 in the closing phase, when the valve is close to the closure position, in that the oil present in the variable volume chamber is forced to flow into the pressurised fluid chamber C passing through the clearance present between the end nose 31 and the opening wall 30 engaged thereby. Besides the communication constituted by the opening 30, the pressurised fluid chamber C and the variable volume chamber of the piston 21 communicate with respect to each other through internal passages obtained in the body of the piston 21 and controlled by a check valve 32 which allows the passage of fluid only from the pressurized chamber C to the variable volume chamber of the piston 21.

During the normal operation of the known engine illustrated in FIG. 1, when the solenoid valve 24 excludes the communication of the pressurised fluid chamber C with the exhaust channel 23, the oil present in such chamber transmits the movement of the pumping piston 16, imparted by the cam 14, to the piston 21 which controls the opening of the valve 7. In the initial phase of the opening movement of the valve, the fluid coming from the chamber C reaches the variable volume chamber of the piston 21 passing through the check valve 32 and further passages which place the internal cavity of the piston 21, which is tubular-shaped, in communication with the variable volume chamber. After a first displacement of the piston 21, the nose 31 exits from the opening 30, hence the fluid coming from the chamber C may pass directly into the variable volume chamber through the opening 30, now free.

In the reverse movement for closing the valve, as previously mentioned, during the final phase, the nose 31 enters into the opening 30 causing the hydraulic braking of the valve, so as to avoid impacts of the body of the valve against the seat thereof, for example after an opening of the solenoid valve 24 which causes the immediate return of the valve 7 to the closed position.

In the described system, when the solenoid valve 24 is enabled, the valve of the engine follows the movement of the cam (full lift). An early closure of the valve can be obtained by disabling (opening) the solenoid valve 24, thus emptying the hydraulic chamber and obtain the closure of the valve of the engine under the action of the respective return springs. Analogously, a delayed opening of the valve can be obtained by delaying the opening of the solenoid valve, while the combination of a delayed opening with an early opening of the valve can be obtained by enabling and disabling the solenoid valve during the thrust of the relative cam. According to an alternative strategy, according to the teachings of the patent application EP 1 726 790 A1 of the applicant, each intake valve can be controlled in "multi-lift" mode i.e. according to two or more repeated opening and closing "sub-cycles". In each sub-cycle, the intake valve opens and then closes completely. The electronic control unit is thus capable of obtaining a variation of the opening instant and/or of the closing instant and/or of the lift of the intake valve, as a function of one or more engine operative parameters. This allows obtaining the maximum efficiency of the engine, and lower consumption of fuel, under any condition of operation.

Figure 2:
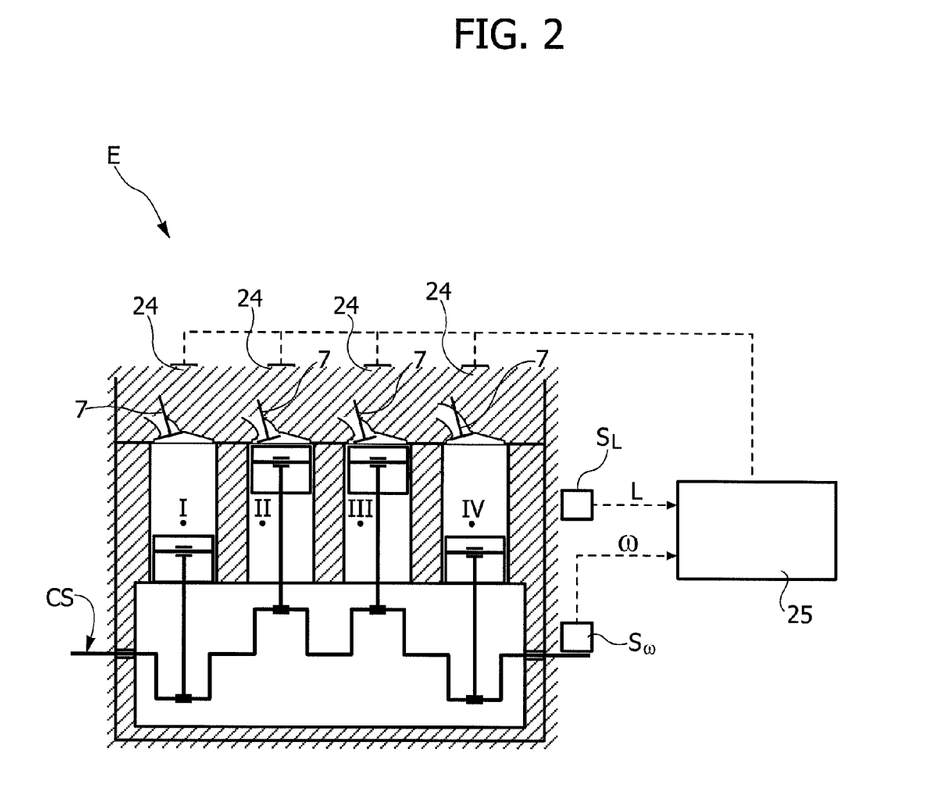
FIG. 2 is a schematic view of a multicylinder engine according to the invention.

The engine according to the invention, schematically illustrated in FIG. 2, is provided with a system for the variable actuation of the intake valves of the type described above with reference to FIG. 1. Now, with reference to FIG. 2, a multi-cylinder engine (which is a four-cylinder engine in the case of the illustrated example) comprising an engine shaft CS and four inline cylinders, respectively indicated with I, II, III, IV, is indicated in its entirety with reference E. FIG. 2 schematically shows a single intake valve 7 for each cylinder of the engine. The figure also schematically illustrates the solenoid valves 24 associated to the four engine cylinders for controlling the system for variable actuation of each intake valve 7. Obviously, the intake valves associated to each cylinder could also be more than one. The solenoid valves 24 are controlled by the electronic control unit 25 according to a signal ω coming from a sensor Sω of the rotation speed of the engine shaft CS and according to a signal L coming from a sensor $S_L$ of the engine load.

Figure 5:
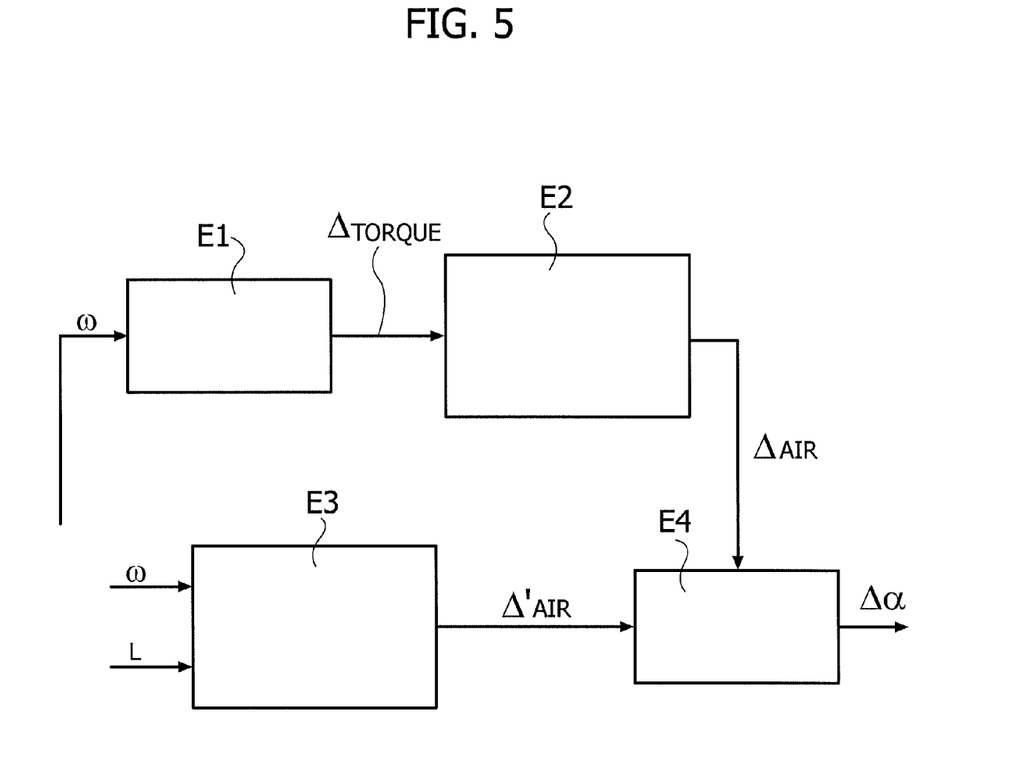
FIG. 5 is a block diagram showing the control system part of the engine according to the invention.

With reference to FIG. 5, the signal Sω indicating the rotation speed of the engine is sent to a first electronic module E1 which conducts a high frequency analysis of the signal Sω and dynamically obtains therefrom, during the operation of the engine, signals $\Delta_{TORQUE}$ indicating the differences of the torque produced by the various cylinders. The system also comprises a second electronic module E2 adapted to dynamically calculate, during the operation of the engine, with a closed loop procedure, as a function of the abovementioned signals $\Delta_{TORQUE}$ indicating the differences of the torque produced by the various cylinders, a first correction $\Delta_{AIR}$ regarding the amount of air taken in by one cylinder with respect to the other which should be implemented so as to obtain torques produced by the various cylinders substantially identical to each other.

In the preferred embodiment, the system according to the invention further comprises a third electronic module E3 adapted to statically calculate, with an open loop procedure, by means of previously memorised experimental maps, as a function of the signals w and L indicating the rotation speed of the engine and of the engine load, a second correction $\Delta'_{AIR}$ regarding the amount of air taken in by one cylinder with respect to the other which should be implemented so as to obtain torques produced by the various cylinders substantially identical to each other. In the case of such preferred embodiment, the system further comprises a fourth electronic module E4 which receives the correction signals $\Delta_{AIR}$ and $\Delta'_{AIR}$, from said second module E2 and from said third module E3 and processes them to emit—in output—a signal $\Delta\alpha$ indicating a variation of the crank angle value corresponding to the opening of the intake valve for each cylinder of the engine such to ensure that the dispersion in the production of torque of the various cylinders, due to fluid dynamic reasons or a dispersion of single components, is reduced to a minimum value or eliminated entirely, hence limiting the irregularities in the rotation speed of the engine shaft.

Figure 3:
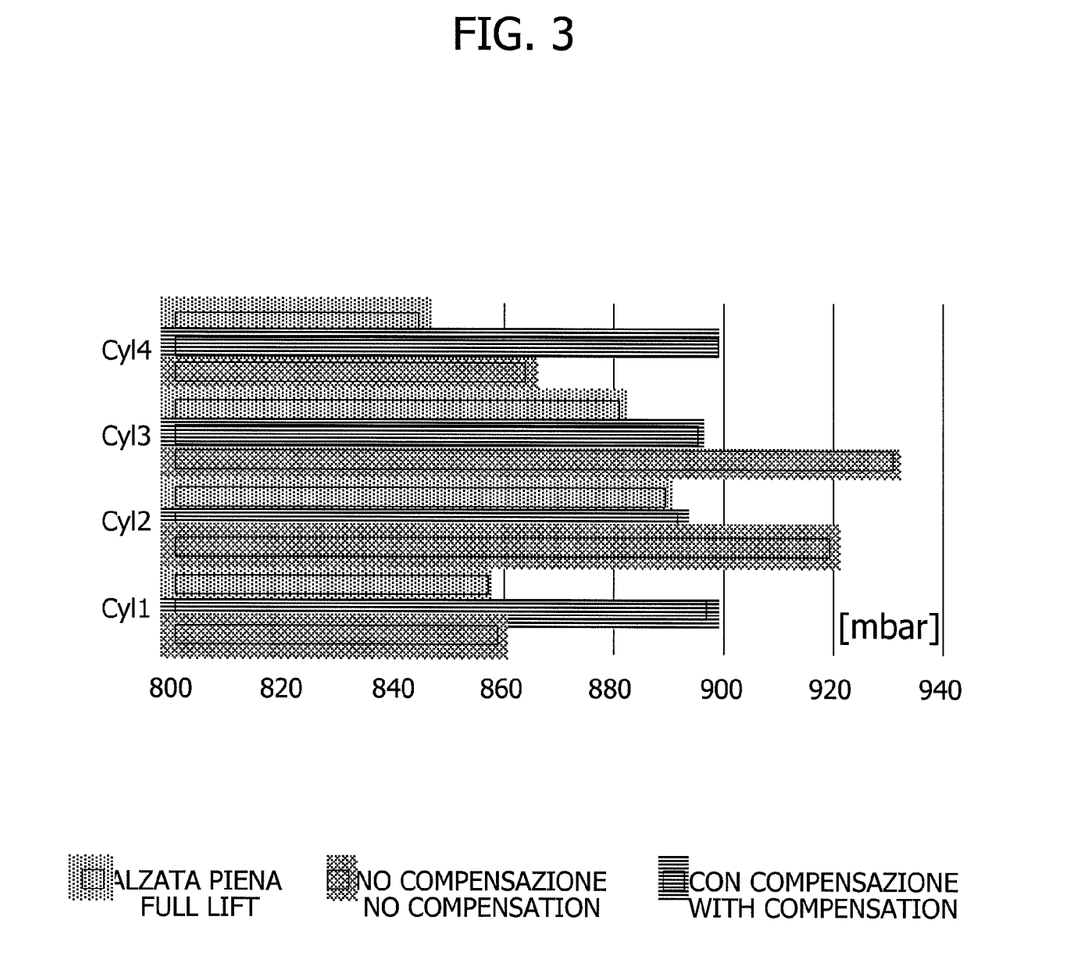
FIG. 3 is a diagram showing the mean effective pressure indicated in the various cylinders of a four-cylinder engine respectively in the prior art case and in the invention case.
Figure 4:
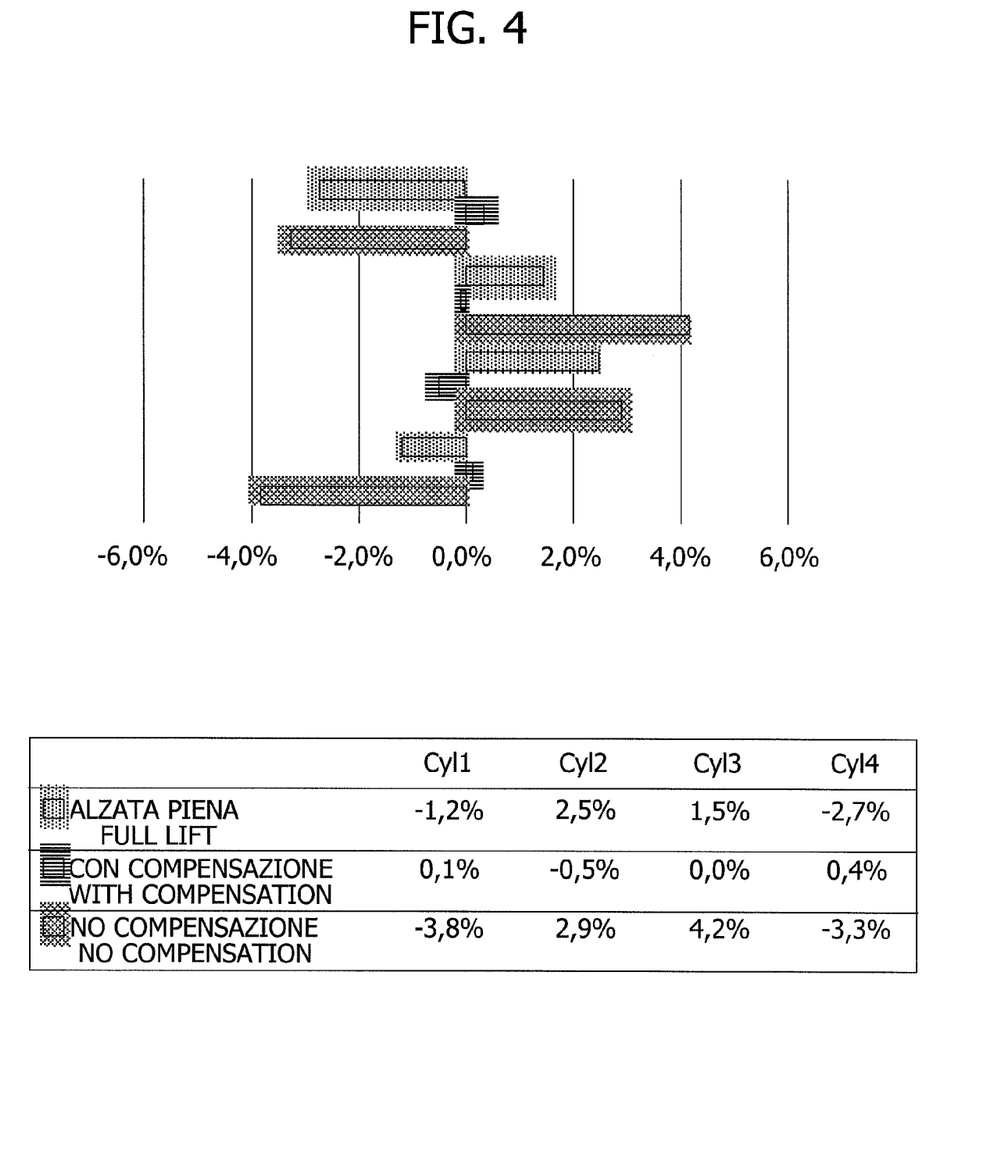
FIG. 4 is a further diagram showing percentage differences in the indicated mean effective pressure values of the various engine cylinders, respectively in the prior art case and in the invention vase.

FIGS. 3, 4 show the beneficial effects of the system according to the invention. FIG. 3 shows the mean effective pressure values indicated in the four engine cylinders respectively with the compensation provided for by the invention and without the compensation provided for by the invention. The diagram also shows the "full lift" case corresponding to the high regime conditions of the engine, in which the system for variable actuation of the valves does not intervene, hence the lift of each intake valve is always complete. No compensation of the type described above occurs in such condition of operation of the engine but this does not represent a problem, given that in the high regimes the differences in the torque produced by each cylinder are low. Such differences are instead influential at low operating regimes of the engine ("no compensation" case) and the diagram shows how the implementation of the compensation provided for by the invention considerable reduces such differences.

The diagram of FIG. 4 and the table annexed thereto show the advantages of the invention even more clearly. The table in particular shows how in the high regime operating conditions (with full lift of the intake valves and thus exclusion of the system of compensation) the variations in the mean effective pressure indicated by the cylinder do not exceed 3%, while the system according to the invention is advantageous at low regimes, where it is capable of substantially reducing percentage differences, which instead at times exceed 4%, to zero.

Obviously, without prejudice to the principle of the invention, the construction details and embodiments may widely vary with respect to what has been described and illustrated purely by way of example, without departing from the scope of protection of the present invention.

What is claimed is:

1. Multi-cylinder internal combustion engine, comprising, for each cylinder:
   a combustion chamber,
   at least one intake conduit and at least one exhaust conduit ending up in said combustion chamber,
   an intake valve and an exhaust valve associated to said intake conduit and said exhaust conduit and each provided with respective return springs which push the valve towards a closed position,
   a camshaft for actuating the intake valves, by means of respective tappets,
   wherein each intake valve is controlled by the respective tappet against the action of the abovementioned return spring by interposing hydraulic means including a presurized fluid chamber on which there is faced a pumping spring connected to the tappet of the valve,
   a solenoid valve which can be controlled between a closed condition and an open condition wherein said solenoid valve places said pressurized fluid chamber in communication with an exhaust channel to decouple the intake valve from the respective tappet and cause the quick closure of the intake valve due to the respective return spring,
   electronic control means, for controlling said solenoid valve to vary the opening instant and/or the closing instant and/or the lift of the intake valve as a function of one or more engine operative parameters,
   wherein said electronic control means are programmed for the differentiated control of the solenoid valve associated to each cylinder,
   said electronic means receiving signals indicating the operative performance of each cylinder during the operation of the engine and programmed to dynamically vary the amount of air taken in by each cylinder during the operation of the engine, through the differentiated control of said solenoid valves, so as to maintain the torques produced by the engine cylinders substantially identical to each other,
   means for sensing the rotation speed of the engine,
   a first electronic module for analyzing the signal emitted by said sensor means, adapted to dynamically obtain, during the operation of the engine, signals indicating the differences of the torque produced by the various cylinders,
   a second electronic module adapted to dynamically calculate, during the operation of the engine, with a closed loop procedure, as a function of the abovementioned signals indicating the differences of the torque produced by the various cylinders, a first correction regarding the amount of air taken in by one cylinder with respect to the other which should be implemented so as to obtain torques produced by the various cylinders substantially identical to each other
   means for sensing the engine load,
   a third electronic module adapted to statically calculate, with an open loop procedure, by means of previously memorized experimental maps, as a function of the signals indicating rotation speed of the engine and the load of the engine, a second correction regarding the amount of air taken in by one cylinder with respect to the other which should be implemented so as to obtain torques produced by the various cylinders substantially identical to each other, and
   a fourth electronic module which receives the correction signals from said second module and from said third module and processes them to emit a signal indicating a variation of the crank angle value corresponding to the opening of the intake valve, for each cylinder of the engine.

2. Method for controlling a multi-cylinder internal combustion engine,
   wherein said engine comprises, for each cylinder:
      a combustion chamber,
      at least one intake conduit and at least one exhaust conduit ending up in said combustion chamber,
      an intake valve and an exhaust valve associated to said intake conduit and said exhaust conduit and each provided with respective return springs which push the valve towards a closed position,
      a camshaft for actuating the intake valves, by means of respective tappets,
      wherein each intake valve is controlled by the respective tappet against the action of the return spring by interposing hydraulic means including a pressurized fluid chamber which is faced by a pumping spring connected to the tappet of the valve,
      a solenoid valve which can be controlled between a closed condition and an open condition wherein said solenoid valve places said pressurized fluid chamber in communication with an exhaust channel, to decouple the intake valve from the respective tappet and cause the quick closure of the intake valve due to the respective return spring,
      electronic control means, for controlling said solenoid valve to vary the opening instant and/or the closing instant and/or the lift of the intake valve as a function of one or more engine operative parameters,
   wherein the solenoid valves associated to the engine cylinders are controlled in a differentiated manner, the operative performance of each cylinder of the engine is detected during the operation of the engine and the amount of air taken in by each cylinder is varied dynamically during the operation of the engine, through the differentiated control of said solenoid valves, so as to maintain the torques produced by the engine cylinders substantially identical to each other,
   detecting the rotation speed of the engine by means of sensor means,
   analyzing the signal emitted by said sensor means to dynamically obtain, during the operation of the engine, signals indicating the differences of the torque produced by the various cylinders,
   dynamically calculating during the operation of the engine, with a closed loop procedure, as a function of the abovementioned signals indicating the differences of the torque produced by the various cylinders, a first correction regarding the amount of air taken in by one cylinder with respect to the other which should be implemented so as to obtain torques produced by the various cylinders substantially identical to each other,—detecting the load of the engine by means of sensor means,
   statically calculating, with an open loop procedure, by means of previously memorized experimental maps, as a function of the signals emitted from said means for detecting the rotation speed of the engine and the engine load, a second correction regarding the amount of air taken in by one cylinder with respect to the other which should be implemented so as to obtain torques produced by the various cylinders substantially identical to each other, and
   processing the data regarding said first correction and said second correction to emit a signal indicating a variation of the crank angle value corresponding to the opening of the intake valve for each cylinder of the engine.

* * * * *